United States Patent Office

3,645,982
Patented Feb. 29, 1972

3,645,982
SYNTHESIS OF POLY(ALLYL URETHANES)
Donald W. Larsen, Ashton, Md., assignor to
W. R. Grace & Co., New York, N.Y.
No Drawing. Filed Nov. 24, 1969, Ser. No. 879,537
Int. Cl. C08g 22/06
U.S. Cl. 260—77.5 BB                                   4 Claims

ABSTRACT OF THE DISCLOSURE

Allyl urethane is formed by reacting a solution of an allyl halide, an alkali metal cyanate and a polyol. The allyl urethanes are useful in the preparation of photocurable liquid polymers, that are photocured by the free radical addition of thiol groups of polythiols to the allyl double bonds.

BACKGROUND OF THE INVENTION

(1) Objective of the invention

It is an objective of this invention to provide a process for the direct preparation of allyl urethane. Other objectives will be obvious to those skilled in the art.

(2) Prior art

U.S. Pat No. 3,379,687 discloses simultaneously reacting together a polyhalo organic compound, a polyol and an alkali metal cyanate. Polyurethanes are formed in situ. The polyhalo organic compounds contain at least two halogen atoms which are attached to an unsaturated aliphatic or cycloaliphatic radical.

Polyurethanes have been prepared by reacting 1,4-dichloro-2-butene, sodium cyanate and diols.

BROAD DESCRIPTION OF THE INVENTION

This invention broadly involves preparing a solution of allyl chloride, sodium cyanate and a polyol. A compatible solvent is used in the solution preparation. The allyl chloride reacts with the sodium cyanate in situ to form allyl isocyanate, which immediately reacts with the polyol to form allyl urethane.

The allyl urethane can be mixed with a polythiol and photocured by exposure to ultraviolet radiation. The photocuring is achieved by the free radical addition of the thiol groups of the polythiols to the double bonds of the allyl urethane.

DETAILED DESCRIPTION OF THE INVENTION

The preferred process of this invention; to produce the allyl urethane, can be represented by the following formula:

R(OH)$_n$+$n$CH$_2$=CH—CH$_2$Cl+$n$NaOCN→
R(O—C—NH—CH$_2$—CH=CH$_2$)$_n$+$n$NaCl where R is an organic moiety, and $n$ is at least two.

Allyl chloride (CH=CH CH$_2$Cl), also termed 3-chloropropene, has a boiling point of 44.6° C. Allyl bromide (CH$_2$=CHCH$_2$Br) has a boiling point of 71.3° C. Allyl iodide (CH$_2$=CHCH$_2$I) has a boiling point of 103.1° C.

Suitable alkali metal cyanates include sodium cyanate (NaOCN), potassium cyanate (KOCN), etc.

A useful polyol (polyhydric alcohols) is any organic alcohol which has two or more active hydroxyl radicals, which can be primary, secondary or tertiary. Examples of useful polyols are glycerol, erythritol, ribitol, xylitol, allitol, dulcitol, pentaerythritol, tripentaerythritol, 1,2,4-butanetriol, 1,2,6-hexanetriol, 1,4-butanediol, etc. Further, the polyols may be either monomeric or polymeric in character. For example, a useful polymeric polyol is poly(ethylene oxide)diol.

The compatible solvent should be a polar solvent which is non-reactive with the reacting component. Examples of preferred solvents are: N,N-dimethylformamide, N,N-diethylformamide, N,N-dimethylacetamide, N,N-diethylacetamide, N-methyl-N-phenylformamide, N-methylpyrrolidone and N-methylcaprolactam; and nitroles such as acetonitrile and propionitrile.

Although the temperature employed in the process of this invention can vary over a wide range, it will generally be within the range of about 80° to 300° C., preferably being within the range of about 120° to 250° C. The reaction time ranges between 1 and 24 hours, and preferably is between 3 and 10 hours. The reaction may preferably be carried out in an autoclave to maintain a high concentration of allyl chloride in solution and to make use of low boiling solvents.

After the allyl urethane is formed, the NaCl is removed from the slurry by any convenient method such as filtration. The solvent is separated from the product by distillation. Alternatively, the product is washed with water to remove NaCl and solvent.

The crucial ingredients in the photocurable composition are:

(1) About 2 to about 98 parts by weight of an allyl urethane having an allyl functionality of at least two;
(2) About 98 to 2 parts by weight of a polythiol; and
(3) About 0.005 to about 50 parts by weight (based on 100 parts by weight of (1) and (2) of a photocuring rate accelerator).

As used herein, the term polythiols refers to simple or complex organic compounds having a multiplicity of pendant or terminally positioned—SH functional groups per average molecule.

On the average, the polythiols must contain 2 or more —SH groups per molecule. They usually have a viscosity range of slightly above 0 to about 20 million centipoises (cps.) at 70° C., as measured by a Brookfield Viscometer. Included in the term "polythiols" as used herein, are those materials which in the presence of an inert solvent, aqueous dispersion or plasticizer fall within the viscosity range set out above at 70° C. Operable polythiols in the instant invention usually have molecular weights in the range about 50 to about 20,000, or more, preferably about 100 to about 10,000.

The polythiols operable in the instant invention can be exemplified by the general formula: R$_a$—(SH)$_n$ where $n$ is at least 2 and R$_a$ is a polyvalent organic moiety free from "reactive" carbon-to-carbon unsaturation. Thus R$_a$ may contain cyclic groupings and minor amounts of hetero atoms such as N, S, P or O, but primarily contains carbon-hydrogen, carbon-oxygen, or silicon-oxygen containing chain linkages free of any "reactive" carbon-to-carbon unsaturation.

As used herein the term "reactive" unsaturated carbon-to-carbon groups means which will react under proper conditions as set forth herein with thiol groups to yield the thioether linkage

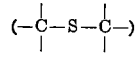

as contrasted to the term "unreactive" carbon-to-carbon unsaturation which means

groups found in aromatic nuclei (cyclic structures exemplified by benzene, pyridine, anthracene, and the like) that do not under the same conditions react with thiols to give thioether linkages.

One class of polythiols operable with polyenes in the instant invention to obtain essentially odorless compositions are esters of thiol-containing acids of the general formula: HS—R$_b$—COOH, where R$_b$ is an organic moiety containing no "reactive" carbon-to-carbon unsaturation, with polyhydroxy compounds of the general structure: $R_c$—(OH)$_n$ where $R_c$ is an organic moiety containing no "reactive" carbon-to-carbon unsaturation and $n$ is 2 or greater. These components will react under suitable conditions to give a polythiol having the general structure:

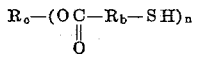

where $R_b$ and $R_c$ are organic moieties containing no "reactive" carbon-to-carbon unsaturation and $n$ is 2 or more.

Certain polythiols (ethane dithiols, hexamethylene dithiol, decamethylene dithiol, tolylene-2,4-dithiol, etc.) and some polymeric polythiols such as a thiol-terminated ethylcyclohexyl dimercaptan polymer, etc. and similar polythiols which are conveniently and ordinarily synthesized on a commercial basis, although having obnoxious odors, are operable in this invention. Examples of the polythiol compounds preferred for this invention because of their relatively low odor level and fast curing rate include but are not limited to esters of thioglycolic acid (HS—CH$_2$COOH), α-mercaptopropionic acid

and β-mercaptopropionic acid (HS—CH$_2$CH$_2$COOH) with polyhydroxy compounds such as glycols, triols, tetraols, pentaols, hexaols, etc. Specific examples of the preferred polythiols include, but are not limited to, ethylene glycol bis(thioglycolate), ethylene glycol bis(β-mercaptopropionate), trimethylolpropane tris(thioglycolate), trimethylolpropane tris(β - mercaptopropionate), pentaerythritol tetrakis (thioglycolate) and pentaerythritol tetrakis (β-mercaptopropionate), all of which are commercially available. A specific example of a preferred polymeric polythiol is poly(propylene ether) glycol bis-(β-mercaptopropionate) prepared from poly(propylene ether) glycol (e.g., Pluracol P2010, Wyandotte Chemical Corp.) and β-mercaptopropionic acid by esterification.

The preferred polythiol compounds are characterized by a low level of mercaptan-like odor initially, and after reaction give essentially odorless cured polythioether end products which are commercially useful resins or elastomers.

As used here in the term "odorless" means the substantial absence of the well-known offensive and sometimes obnoxious odors that are characteristic of hydrogen sulfide and the derivative family of compounds known as mercaptans.

The term "functionality" as used herein refers to the average number thiol groups per molecule in the polythiol. A polymeric dithiol is a polythiol with an average of two thiol groups per molecule and thus has a functionality ($f$) of 2. It is further understood and implied in the above definitions that in these systems the functionality of the polythiol component is commonly expressed in whole numbers although in practice the actual functionality may be fractional.

The photocuring reaction can be initiated by U.V. radiation contained in actinic radiation from sunlight or obtained from special light sources which emit significant amounts of U.V. light. (Useful U.V. radiation generally has a wavelength in the range of about 2000 to about 4000 angstrom units.) Thus, it is possible merely to expose the photocurable material to actinic radiation under ambient conditions or otherwise and obtain a cured solid elastomeric or resinous product useful as a rigidizing material. But this approach to the problem results in extremely long exposure times which cause the process in the vast bulk of applications to be commercially unfeasible. Chemical photocuring rate accelerators (photoinitiators or -sensitizers or -activators) serve to drastically reduce the exposure time and thereby when used in conjunction with various forms of energetic radiation (containing U.V. radiation) yield very rapid, commercially practical photocures by the practice of the instant invention. Useful photocuring rate accelerators include benzophenone, acetophenone, acenapthenequinone, methyl ethyl ketone, thioxanthen-9-one, 7-H-benz (de) anthracene-7-one, dibenzosuberone, 1-naphthaldehyde, 4,4'-bis-(dimethylamino)benzophenone, fluorene-9-one, 1'-acetonaphthone, 2'-acetonaphthone, 2,3-butanedione, anthraquinone, 1-indanone, 2-tert-butyl anthroquinone, valerophenone, hexanophenone, 8-phenylbutyrophenone, p-morpholinopropiophenone, 4 - morpholinobenzophenone, 4'-morpholinodesoxybenzoin, p-diacetylbenzene, 4-aminobenzophenone, 4'-methoxyacetophenone, benzaldehyde, a-tetralone, 9-acetylphenanthrene, 3-acetylindole, 1,3,5-triacetylbenzene; etc., and blends thereof. The photo-initiators are added in an amount ranging from about 0.0005 to about 50 percent by weight of the allyl urethane and polythiol components in the instant invention. Benzophenone is the preferred photocuring rate accelerator.

The compositions to be photocured, in accord with the present invention, may, if desired, include such additives as antioxidants, inhibitors, activators, fillers, antistatic agents, flame-retardant agents, thickeners, thixotropic agents, surface-active agents, viscosity modifiers, plasticizers, and the like within the scope of this invention. The aforesaid additives may be present in quantities up to 500 parts or more per 100 parts photocurable composition by weight and preferably 0.0005 to 300 parts on the same basis. The type and concentration of the additives must be selected with great care so that the final composition remains photocurable under any conditions of exposure encountered.

The compounding of the components prior to photocuring can be carried out in any conventional manner which takes into account that the material is sensitive to U.V. radiation. This composition generally can be stored in the dark for extended periods of time prior to actual use.

The above photocurable compositions (minus the photocuring rate accelerator) can also be cured by other active electromagnetic or ionizing radiation sources, e.g. electron beams, gamma rays, lasers, visible radiation sources, infrared radiation sources, etc.

The photocured materials can be used as printing plates, photographic materials, product coatings, etc.

The useful polyenes of this invention can also be cured by vinyl polymerization.

The following examples will aid in explaining, but should not be deemed as limiting, the instant invention. In all cases, unless otherwise noted, all parts and percentages are by weight.

Example 1.—A slurry was prepared by admixing 65 grams of sodium cyanate (1 equivalent of OCN$^-$), 100 grams of polyol A (0.88 equivalents of OH$^-$) and 100 grams of dimethylformamide (B.P.=153° C.). Polyol A is NIAX Polyol LS–490, which is the trade designation for a rigid foam polyether, and which is commercially available from Union Carbide. The slurry was refluxed and 70 grams of allyl chloride (0.92 mole) were added slowly to the slurry so that the temperature was not depressed below 120° C. The slurry was then filtered and the remaining dimethylformamide was washed out of the filtrant (filtered product) with water. The product was allyl urethane.

Example 2.—Five grams of the allyl urethane were admixed with one gram of pentaerythritol tetrakis (mercaptopropionate) and one drop (0.05 ml.) of melted benzophenone. Pentaerythritol tetrakis (β-mercaptopropionate), is commercially available under the trade name "Mercaptate Q–43 Ester" (sold by Carlisle Chemical Co.). The admixture was formed into a thin layer and cured to a non-tacky rubbery solid in five minutes by exposure to ultraviolet light. (The U.V. light source was a Westinghouse 275 Watt Sunlamp.)

Example 3.—Examples 1 and 2 were repeated, except that 81 grams of potassium cyanate were used in place of the sodium cyanate. A non-tacky rubbery solid was obtained after five minutes exposure to U.V. light.

Examples 4 to 7.—Example 2 was repeated four times, except that the pentaerythritol tetrakis (β-mercaptopropionate) was replaced with trimethylolpropane tris (β-mercaptopropionate) (1 gram), trimethylolpropane tris (thioglycolate), (1 gram), pentaerythritol tetrakis (thioglycolate), (1 gram), polypropylene ether triol tris (β-mercaptopropionate) (1 gram), respectively. A non-tacky rubbery solid was obtained in each instance.

Example 8.—Example 7 was repeated, except that half of the pentaerythritol tetrakis (β-mercaptopropionate) was replaced with 5 grams of ethylene glycol bis(β-mercaptopropionate). A non-tacky rubbery solid was obtained after 5 minutes exposure to U.V. light.

Examples 9 to 14.—Example 2 was repeated six times, except that the benzophenone was replaced with cyclohexanone (1 drop), acetone (1 drop), methyl ethyl ketone (1 drop), dibenzosuberone (1 drop), a blend of acetone (.05 gram), and p-diacetylbenzene (.05 gram), and 3-acetylphenanthrene (.05 gram) respectively. A non-tacky rubbery substance was obtained in each instance.

Example 15.—Example 2 was repeated, except that 3 grams of "Dion Polymercaptan Resin DPM-1002" (which is a thiol terminated liquid polymer having a functionality of 2 to 3 and a molecular weight of about 5000, and is commercially available from Diamond Alkali Co.), were used in place of the pentaerythritol tetrakis (mercaptopropionate). A non-tacky rubbery solid was obtained after five minutes exposure to U.V. light.

What is claimed is:
1. The process for preparing poly(allyl urethane) which comprises reacting together at a temperature in the range 80–300° C. in the presence of a polar solvent which is non-reactive with the reacting components (a) an alkali metal cyanate, (b) an organic alcohol which has two or more active hydroxyl radicals, and (c) an allyl halide, wherein said alkali metal cyanate reacts with said allyl halide to form allyl isocyanate and wherein said allyl isocyanate reacts with said organic alcohol to form allyl urethane.
2. The process of claim 1, wherein said polar solvent is N,N-dimethylformamide.
3. The process of claim 1 wherein said alkali metal cyanate is sodium cyanate.
4. The process of claim 1, wherein said allyl halide is allyl chloride.

References Cited

UNITED STATES PATENTS 3,379,687   4/1968   Doss et al. _____ 260—47

DONALD E. CZAJA, Primary Examiner

M. I. MARQUIS, Assistant Examiner

U.S. Cl. X.R.

204—159.14, 159.18; 260—79.5 C, 77.5 B, 482 C